United States Patent
Yoshida et al.

(10) Patent No.: US 8,334,963 B2
(45) Date of Patent: Dec. 18, 2012

(54) DISPLAY COMPRISING A PLURALITY OF SPACER ROWS HAVING FIRST AND SECOND PROTRUDING PORTIONS AND METHOD OF MANUFACTURING THE SAME

(75) Inventors: Tokuo Yoshida, Tenri (JP); Noriko Watanabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 752 days.

(21) Appl. No.: 12/299,503

(22) PCT Filed: Jan. 30, 2007

(86) PCT No.: PCT/JP2007/051473
§ 371 (c)(1),
(2), (4) Date: Nov. 4, 2008

(87) PCT Pub. No.: WO2007/141929
PCT Pub. Date: Dec. 13, 2007

(65) Prior Publication Data
US 2009/0066903 A1    Mar. 12, 2009

(30) Foreign Application Priority Data
Jun. 7, 2006    (JP) .................................. 2006-158383

(51) Int. Cl.
*G02F 1/1339*    (2006.01)
(52) U.S. Cl. ........................ 349/153; 349/155
(58) Field of Classification Search .......... 349/153–154, 349/155–157
See application file for complete search history.

(56) References Cited

U.S. PATENT DOCUMENTS

| 4,640,583 | A | 2/1987 | Hoshikawa et al. | |
|---|---|---|---|---|
| 6,705,584 | B2 * | 3/2004 | Hiroshima et al. | 249/155 |
| 6,734,942 | B2 | 5/2004 | Takeuchi | |
| 7,088,418 | B1 * | 8/2006 | Yamashita et al. | 349/153 |
| 7,515,241 | B2 * | 4/2009 | Kim et al. | 349/153 |
| 2002/0063839 | A1 | 5/2002 | Matsumoto | |
| 2002/0131009 | A1 * | 9/2002 | Takeuchi | 349/153 |
| 2003/0025868 | A1 * | 2/2003 | Hiroshima et al. | 349/156 |
| 2005/0238853 | A1 | 10/2005 | Kim et al. | |
| 2006/0109413 | A1 * | 5/2006 | Lee | 349/153 |
| 2006/0146265 | A1 | 7/2006 | Park | |

FOREIGN PATENT DOCUMENTS

| CN | 1786798 A | 6/2006 |
|---|---|---|
| JP | 2006-062344 A | 3/2006 |

OTHER PUBLICATIONS

Official Communication issued in International Patent Application No. PCT/JP2007/051473, mailed on Feb. 27, 2007.

* cited by examiner

*Primary Examiner* — Mark Robinson
*Assistant Examiner* — Dennis Y Kim
(74) *Attorney, Agent, or Firm* — Keating & Bennett, LLP

(57) ABSTRACT

A display device includes a plurality of spacer rows that are provided outside a display region on one of a pair of substrates, and each of the spacer rows is defined by a plurality of spacers arranged in a row at predetermined intervals along an outer edge of the display region. Each spacer has a substantially elongated shape extending along the outer edge of the display region. A gap between adjacent spacers in each spacer row is defined by a slit portion having a shorter length than a longitudinal length of the spacer, and the plurality of spacer rows are entirely covered by the seal member between the pair of substrates.

4 Claims, 7 Drawing Sheets

DISPLAY COMPRISING A PLURALITY OF SPACER ROWS HAVING FIRST AND SECOND PROTRUDING PORTIONS AND METHOD OF MANUFACTURING THE SAME

BACKGROUND OF THE INVENTION

1. Field of the Invention

The present invention relates to a display device having a display region surrounded by a seal member, and a manufacturing method thereof.

2. Description of the Related Art

In recent years, the demand for so-called thin display devices, such as liquid crystal display devices, has been rapidly growing. A liquid crystal display device has a pair of substrates and a liquid crystal layer provided between the substrates. The liquid crystal layer is usually surrounded by a seal member made of, for example, a thermosetting resin, and is thereby sealed between the pair of substrates. The seal member typically has an approximately rectangular frame shape. A display region that contributes to display is provided inside the seal member.

Japanese Laid-Open Patent Publication No. SHO 60-26321 discloses a seal member having a double structure in a flexible liquid crystal display device. In other words, an inner portion (the display region side) of the seal member is formed by a first seal portion, and a portion outside the first seal member is formed by a second seal portion. The first seal portion is made of a resin having low water permeability, and the second seal portion is made of a flexible resin.

Japanese Laid-Open Patent Publication No. 2002-277884 discloses a dam pattern that is formed between a seal member and a display region in order to prevent the seal member from flowing into the display region. The dam pattern hinders a flow of the seal member and the seal member is thus prevented from flowing into the display region.

As shown in FIG. 15, it is known in the art that, in a seal region 103 which is located outside a display region 101 and in which a seal member 102 is provided, photo spacers 104 having a dot pattern are dispersedly arranged on a substrate surface as in the display region 101. The photo spacers 104 have a square shape when viewed from above and each side of the square has a length of, for example, about 10 μm. The gap between a pair of substrates (cell gap) is kept constant by the photo spacers 104 in the seal region 103 and photo spacers (not shown) in the display region 101.

In the case of applying a seal member on a substrate by a dispenser or the like, it is difficult to accurately supply the seal member to a predetermined seal region where the seal member is supposed to be formed. If the seal member is supplied to a region inside the seal region on the display region side, the seal member may enter a liquid crystal layer, causing degradation in display quality. If the seal member is supplied to a region outside the seal region, on the other hand, reliable sealing cannot be obtained between a pair of substrates.

SUMMARY OF THE INVENTION

In order to overcome the problems described above, preferred embodiments of the present invention provide a seal member that can be easily and accurately formed in a predetermined region.

In order to provide the above seal member according to a preferred embodiment of the present invention, a spacer row is defined by a plurality of spacers having an elongated shape extending along an outer edge of a display region. A plurality of spacer rows are arranged outside the display region and are entirely covered by a seal member.

More specifically, a display device according to a preferred embodiment of the present invention includes a pair of substrates bonded to each other with a spacer interposed therebetween, a display medium layer provided between the pair of substrates, an approximately frame-shaped seal member for sealing the display medium layer between the pair of substrates, and a display region arranged so as to be surrounded by the seal member, wherein a plurality of spacer rows are arranged outside the display region on one of the pair of substrates and each spacer row is defined by a plurality of spacers arranged in a row at predetermined intervals along an outer edge of the display region. Each spacer in each spacer row preferably has an elongated shape extending along the outer edge of the display region, a gap between adjacent spacers in each spacer row is arranged as a slit portion having a shorter length than a longitudinal length of the spacer, and the plurality of spacer rows are entirely covered by the seal member between the pair of substrates.

The spacer preferably has a lower moisture permeability than the moisture permeability of the seal member.

Preferably, the slit portion in one of the plurality of spacer rows is arranged so that it does not overlap the slit portion in an adjacent spacer row in a direction that is perpendicular or substantially perpendicular to an arranging direction of the spacer row.

The seal member may preferably be made of a thermoplastic resin.

A method for manufacturing a display device according to another preferred embodiment of the present invention includes a display medium layer sealed by an approximately frame-shaped seal member between a first substrate and a second substrate, and a display region for performing display is provided so as to be surrounded by the seal member. This method includes a spacer row formation step of forming a plurality of spacer rows outside the display region on the first substrate with each spacer row being formed by a plurality of spacers arranged in line at predetermined intervals along an outer edge of the display region, a seal member supply step of supplying a flowable seal member to a region where the spacer rows are formed on the first substrate, and a bonding step of bonding the second substrate to the first substrate with the seal member interposed therebetween, wherein in the spacer row formation step, each spacer in each spacer row preferably has an elongated shape extending along the outer edge of the display region, and a gap between adjacent spacers in each spacer row is formed as a slit portion having a shorter length than a longitudinal length of the spacer, and in the bonding step, the plurality of spacer rows are entirely covered by the seal member between the first substrate and the second substrate bonded to each other.

The spacer preferably has lower moisture permeability than that of the seal member.

Preferably, in the spacer row formation step, the slit portion in one of the plurality of spacer rows is formed so that it does not overlap the slit portion in an adjacent spacer row in a direction that is perpendicular or substantially perpendicular to an arranging direction of the spacer row.

The seal member may preferably be made of a thermoplastic resin.

Functions of preferred embodiments of the present invention will now be described.

In the display device according to a preferred embodiment of the present invention, a spacer row is defined by a plurality of spacers having an elongated shape extending along an outer edge of a display region, and a plurality of spacer rows that are provided outside the display region and are preferably covered entirely by a seal member. The surface area of the spacer rows is therefore increased.

Accordingly, when the display device is manufactured, the seal member can be more easily attracted by a surface tension in the seal member supply step. In other words, even if the seal member is applied to a position that is spaced slightly away from a region on a substrate in which the seal member is supposed to be provided, the seal member is attracted to the intended formation region by the plurality of spacer rows. As a result, the seal member is easily and accurately provided in a desired region where the plurality of spacer rows are provided.

Moreover, when the spacers have lower moisture permeability than that of the seal member, a material having relatively high moisture permeability can be used as the seal member.

More specifically, when using a flexible substrate, such as a plastic substrate, it is preferable that the seal member also has elasticity so as not to inhibit the flexibility of the substrate. It is therefore desirable to use a thermoplastic resin that has higher elasticity as the seal member rather than a thermosetting resin. However, because thermoplastic resin has relatively high moisture permeability, outside moisture may enter a liquid crystal layer through the seal member.

In view of this problem, according to a preferred embodiment of the invention, a plurality of spacer rows are provided, with each spacer having a lower moisture permeability than that of the seal member. In this case, moisture that tries to pass through the seal member can be blocked by the spacer rows. As a result, elasticity can be applied to the entire seal portion including the spacer rows while reducing moisture permeability in the seal portion. Moreover, when pressure is applied to the seal member, the pressure is dispersed through the slit portions thereby preventing a concentration of pressure.

Moreover, the slit portion in each spacer row is arranged so that it will not overlap the slit portion of an adjacent spacer row in a direction that is perpendicular or substantially perpendicular to the arranging direction of the spacer row. Since the slit portions do not oppose each other in adjacent spacer rows, outside moisture needs to bypass the slit portions of adjacent spacer rows. The outside moisture is therefore less likely to continuously flow through the slit portions of adjacent spacer rows as compared to the case where the slit portions of adjacent spacer rows oppose each other. Entry of outside moisture to the liquid crystal layer side (the display region side) is therefore more effectively suppressed.

According to preferred embodiments of the present invention, a spacer row is defined by a plurality of spacers having an elongated shape extending along an outer edge of a display region, and a plurality of spacer rows are provided outside the display region. Using this arrangement the seal member can therefore be easily and accurately provided in a predetermined region.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described in detail with reference to the accompanying drawings. It should be noted that the present invention is not limited to the preferred embodiments described below.

First Preferred Embodiment

FIGS. 1 through 5 show a first preferred embodiment of the present invention. In this preferred embodiment, a liquid crystal display device will be described as an example of a display device.

Figure 1:
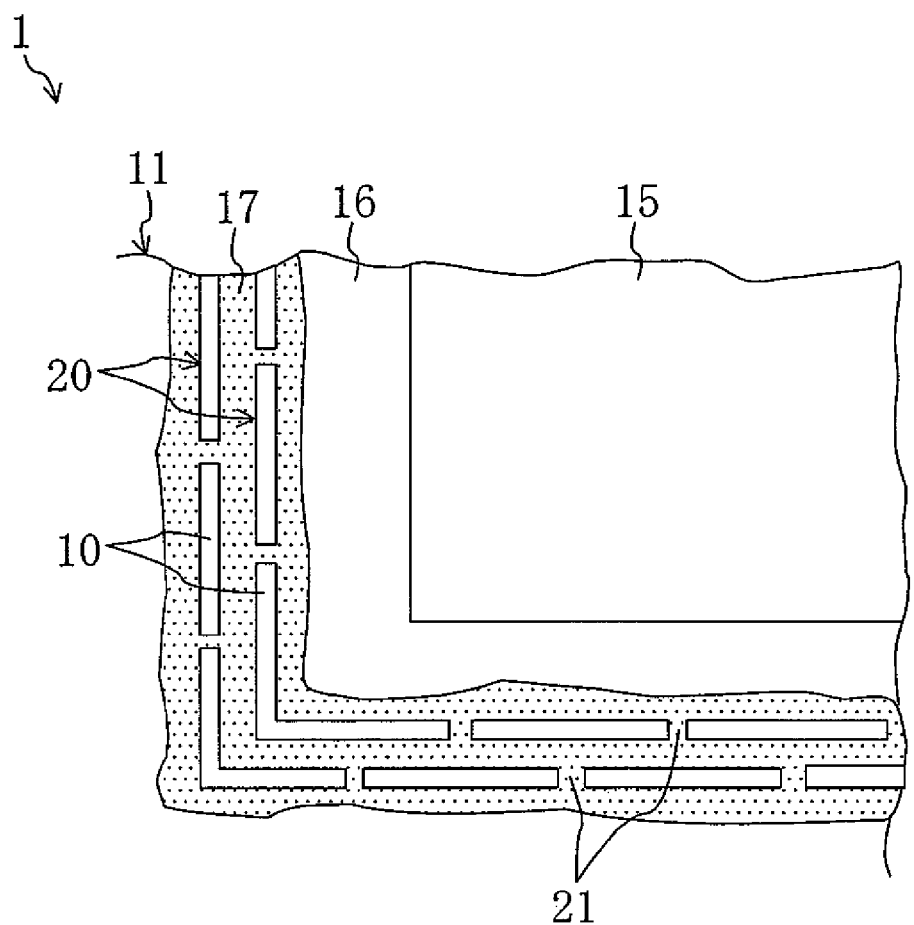
FIG. 1 is a partial enlarged plan view of a liquid crystal display device according to a first preferred embodiment of the present invention.
Figure 2:
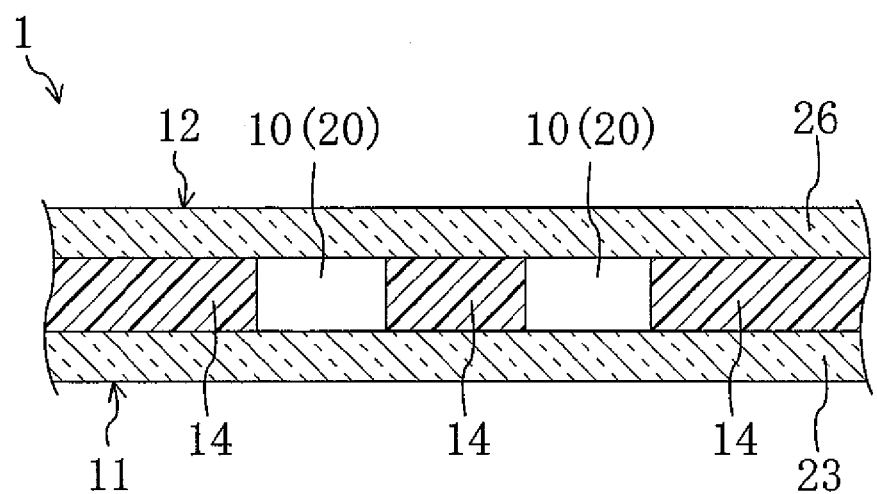
FIG. 2 is a cutaway section showing a seal potion of the liquid crystal display device according to a preferred embodiment of the present invention.
Figure 3:
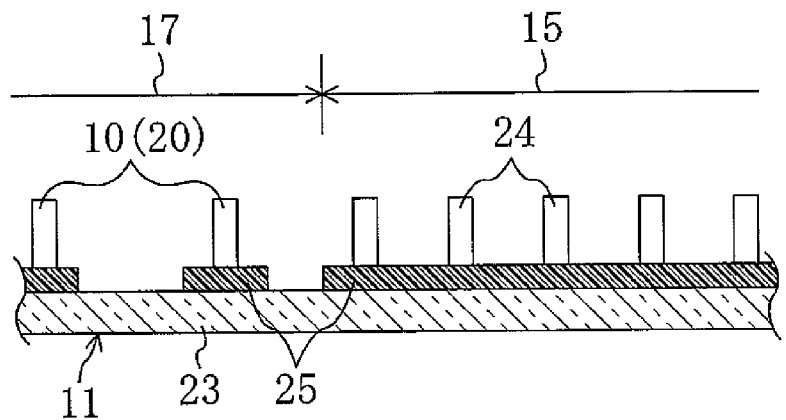
FIG. 3 is a cross-sectional view illustrating a manufacturing process of a liquid crystal display device according to a preferred embodiment of the present invention.
Figure 4:
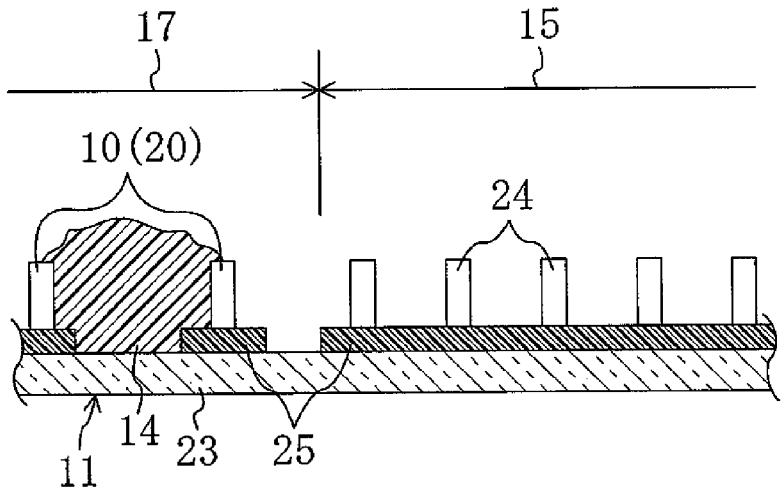
FIG. 4 is a cross-sectional view illustrating a manufacturing process of a liquid crystal display device according to a preferred embodiment of the present invention.
Figure 5:
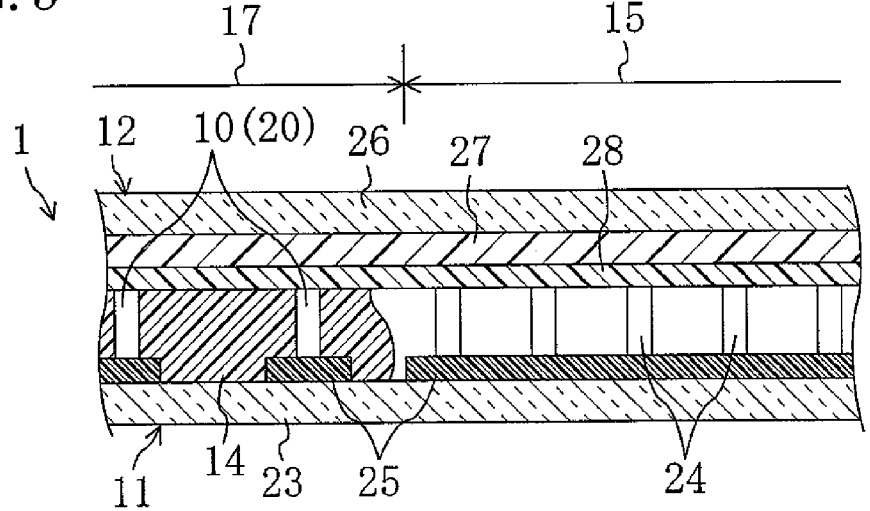
FIG. 5 is a cross-sectional view illustrating a manufacturing process of a liquid crystal display device according to a preferred embodiment of the present invention.

FIG. 1 is a partial enlarged plan view of a liquid crystal display device 1. FIG. 2 is a cutaway section showing a part of the liquid crystal display device 1. FIGS. 3 through 5 are cross-sectional views illustrating a manufacturing process of the liquid crystal display device 1.

Figure 9:
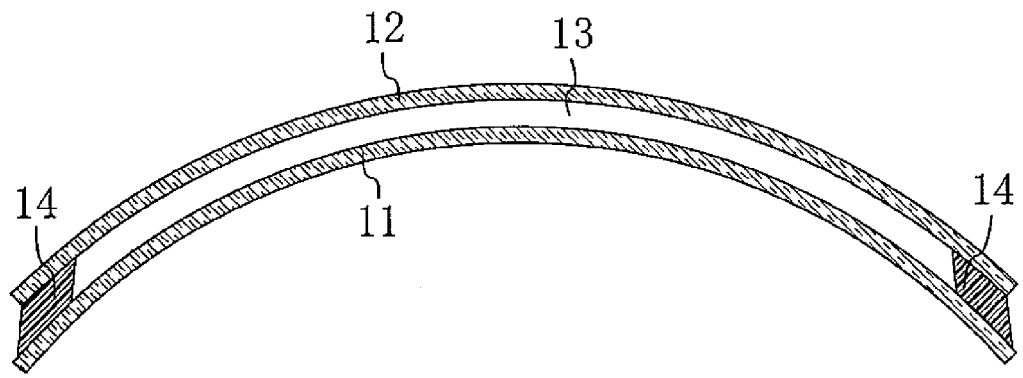
FIG. 9 is a schematic cross-sectional view showing a curved state of a liquid crystal display device of the first preferred embodiment of the present invention.

The liquid crystal display device 1 includes a first substrate 11 and a second substrate 12 which are bonded to each other with spacers 10 interposed therebetween, and a liquid crystal layer 13 (shown in FIG. 9) which is a display medium layer provided between the first substrate 11 and the second substrate 12. The liquid crystal layer 13 is surrounded and sealed by an approximately frame-shaped seal member 14 between the first substrate 11 and the second substrate. The liquid crystal display device 1 has a display region 15 surrounded by the seal member and contributing to display.

Although not shown in the figure, the first substrate 11 provides, for example, a TFT array substrate having a plurality of thin film transistors (hereinafter, simply referred to as TFTs) provided thereon. In other words, a plurality of pixels are arranged in a matrix on the first substrate 11, and TFTs and pixel electrodes connected to the corresponding TFTs are respectively provided in the pixels. A plurality of source lines and a plurality of gate lines are preferably provided on the first substrate 11 so as to cross each other, and are connected to the TFTs in each pixel. A rectangular region where these pixels are provided is the display region 15.

A non-display region 16 that does not contribute to display is provided outside the display region 15 between the display region 15 and the seal member 14. The non-display region 16 has a rectangular frame shape with a predetermined width Although not shown in the figure the second substrate 12 provides a counter substrate having for example, a color filter, a common electrode, and the like provided thereon. The first substrate 11 and the second substrate 12 are made of a plastic substrate so that the liquid crystal display device 1 is flexible as a whole.

Note that the first substrate 11 and the second substrate 12 may alternatively be made of, for example, a glass substrate instead of a plastic substrate. In this preferred embodiment, an active matrix type liquid crystal display device is described as an example. However, the present invention is not limited to this, and the present invention is similarly applicable to, for example, a passive type liquid crystal display device and the like.

The spacers preferably are columnar photo spacers, and are preferably patterned on, for example, the first substrate 11. Although not shown in FIG. 1, spacers provided in the display region 15 have a dot pattern, such as a square dot pattern when viewed from above at a direction substantially normal to the surface of the first substrate 11, and are dispersedly arranged at predetermined intervals.

In the first substrate 11, as shown in FIG. 1, a plurality of spacer rows 20 each include a plurality of spacers 10 provided in a seal region 17 outside the display region 15 in which a seal member 14 is provided. In this preferred embodiment, for example, two spacer rows 20 are preferably provided and these spacer rows 20 form a double rectangular frame shape surrounding the display region 15.

The spacers 10 of each spacer row 20 are arranged in line at predetermined intervals along an outer edge of the display region 15. Each spacer 10 preferably has an elongated shape extending along the outer edge of the display region 15. In other words, each spacer 10 has a rectangular shape when viewed from above. In the four corner regions of each rectangular frame-shaped spacer row 20, as shown in FIG. 1, the spacer 10 may preferably have an L-shape when viewed from above.

In each spacer row 20, the gap between adjacent spacers 10 is provided as a slit portion 21 having a length shorter than a longitudinal length of the spacers 10. For example, the longitudinal length of the spacers 10 is about 100 μm and the width of the slit portion 21 (the distance between the spacers 10) is about 5 μm.

The slit portions 21 in one of the plurality of spacer rows 20 are arranged so as not to overlap the slip portions 21 in an adjacent spacer row 20 in a direction substantially perpendicular to the arranging direction of the spacer row 20 (in other words, the extending direction of the spacer row 20).

As shown in FIG. 2, the two spacer rows 20 are entirely covered by the seal member 14 positioned between the first substrate 11 and the second substrate 12. In other words, the spacer rows 20 are interposed between the first substrate 11 and the second substrate 12. The gap between adjacent spaces 20 is filled with the seal member 14. Moreover, the seal member 14 covers a side surface on the display region 15 side of the two spacer rows 20 and a side surface on the opposite side to the display region 15 of the two spacer rows 20.

The spacer rows 20 preferably have the same height as that of the spacers in the display region 15. The gap between the first substrate 11 and the second substrate 12 (cell gap) is therefore defined by the spacers in the display region 15 and the spacer rows 20 so as to preferably be uniform over the whole substrate. Note that the spacer rows 20 and the spacers in the display region 15 may be provided on the second substrate 12 instead of the first substrate 11.

The spacers 10 of the spacer rows 20 are made of a material having a lower moisture permeability than that of the seal member 14. For example, the seal member 14 is made of a thermoplastic resin. Preferably, the spacers 10 of the spacer rows 20 are made of the same material as that of the spacers in the display region 15 and are formed in the same process step as the spacers in the display region 15.

It is herein assumed that a seal member 34 (shown in FIG. 8) made of a thermosetting resin such as an epoxy-based resin is interposed between the first substrate 11 and the second substrate 12. In this case, the seal member 34 is less likely to be elastically deformed. As shown in a schematic cross-sectional view of FIG. 8, when the first substrate 11 and the second substrate 12 are deformed by bending, the inner substrate (the first substrate 11 in FIG. 8) protrudes outward near the seal member 34, whereby protruding portions 35 are provided. As a result, the cell gap locally increases in the protruding portions 35 and display quality is degraded.

Figure 8:
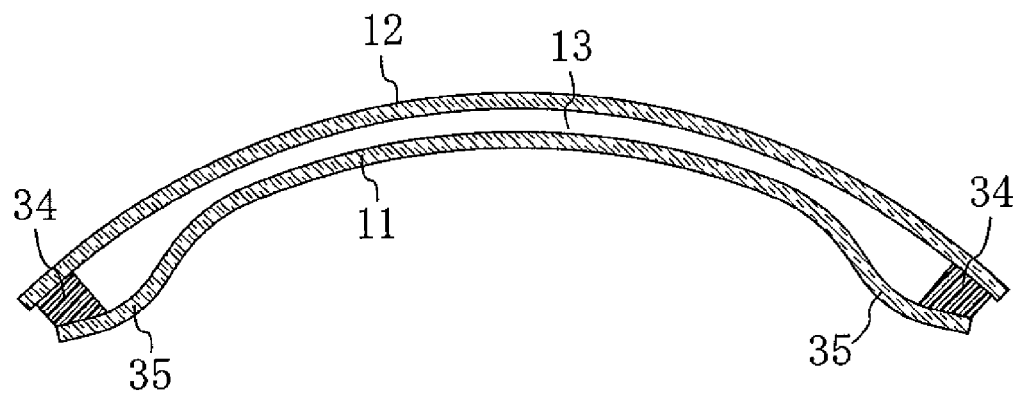
FIG. 8 is a schematic cross-sectional view showing a curved state of a conventional liquid crystal display device.

In this preferred embodiment, on the other hand, the seal member 14 is preferably made of a thermoplastic resin that is relatively easily elastically deformed. As shown in a schematic cross-sectional view of FIG. 9, when the first substrate 11 and the second substrate 12 are deformed by bending, the seal member 14 is elastically deformed accordingly so that the cell gap remains constant, and the first substrate 11 and the second substrate 12 slide with respect to each other. Accordingly, the protruding portions 35 as shown in FIG. 8 are therefore not provided, and degradation in display quality can be prevented.

Manufacturing Method

Hereinafter, a manufacturing method of the liquid crystal display device 1 will be described with reference to FIGS. 3 through 5.

The liquid crystal display device 1 is manufactured by providing the first substrate 11 and the second substrate 12, bonding the first substrate 11 and the second substrate 12 to each other, and then filling the gap therebetween with a liquid crystal layer. In other words, a first substrate formation step, a second substrate formation step, a seal member supply step, and a bonding step are performed.

In the first substrate formation step, not-shown TFTs, not-shown pixel electrodes, a not-shown wiring layer, and a black matrix 25 are patterned over a flexible plastic substrate 23 to form a TFT array substrate. A spacer row formation step is performed in the first substrate formation step. In the spacer row formation step, as shown in FIG. 3, two spacer rows 20 are formed in a seal region 17 which is located outside a display region 15 and in which a seal member 14 is to be formed in a later step, and a plurality of photo spacers 24 are dispersedly formed in the display region 15. The spacers 10 and the photo spacers 24 in the display region 15 are preferably made of the same material and are preferably simultaneously patterned by photolithography or the like.

Each spacer 10 of the spacer rows 20 has an elongated shape extending along an outer edge of the display region 15. In this preferred embodiment, each spacer 10 preferably has, for example, a rectangular or substantially rectangular shape when viewed two-dimensionally. In each spacer row 20, the gap between adjacent spacers 10 is formed as a slit portion having a length (e.g., about 5 µm) shorter than a longitudinal length (e.g., about 100 µm) of the spacers 10. The spacers 10 and 24 preferably have a height of about 5 µm that is the same as the width of slit portions 21, for example. The spacers 10 and 24 preferably have a width of about 10 µm, for example. The gap between adjacent spacer rows 20 is preferably about 10 µm, for example. Each spacer row 20 is thus provided by arranging a plurality of spacers 10 in line at predetermined intervals along the outer edge of the rectangular display region 15.

The slit portions 21 in one of the plurality of spacer rows 20 are preferably arranged so as not to overlap the slit portions 21 in an adjacent spacer row 20 in a direction substantially perpendicular to the arranging direction of the spacer row 20.

In the second substrate formation step, the second substrate 12 is formed as a counter substrate. In other words, as shown in FIG. 5, a color filter 27 is formed on a flexible plastic substrate 26. A common electrode 28, such as an ITO, is then formed so as to substantially cover the color filter 27.

Thereafter, in the seal member supply step, as shown in FIG. 4, a flowable thermoplastic resin is applied as a seal member 14 to a region where the spacer rows 20 are formed in the seal region 17 by a dispenser or the like. The seal member 14 supplied to the first substrate 11 is arranged to be higher than the spacers 10.

Figure 6:
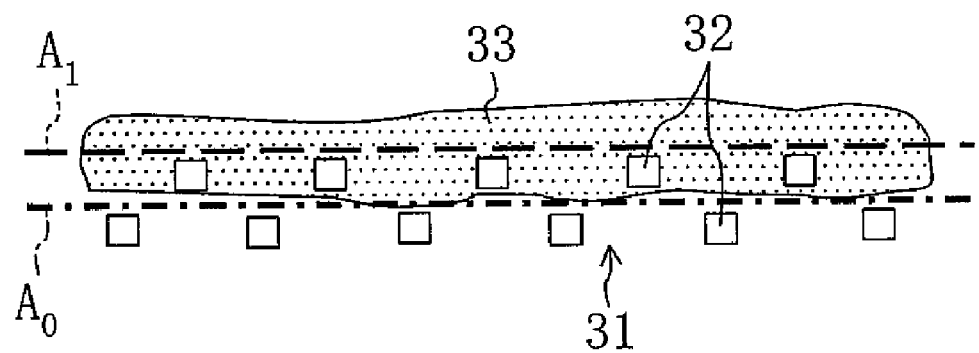
FIG. 6 is an enlarged plan view of conventional spacers.

A supply of the seal member will now be described in detail with reference to enlarged plan views of FIGS. 6 and 7. In a conventional seal region 31, as shown in FIG. 6, photo spacers 32 having a square columnar shape when viewed two-dimensionally are dispersedly arranged in a dot pattern. When a flowable seal member 33 is applied to the seal region 31 by a dispenser or the like, an applied position $A_1$ of the seal member 33 may be located slightly away from a central position $A_0$ of the seal region 31. This may result in defective sealing of the liquid crystal layer 13 and degradation in display quality due to entry of the seal into the display region.

Figure 7:
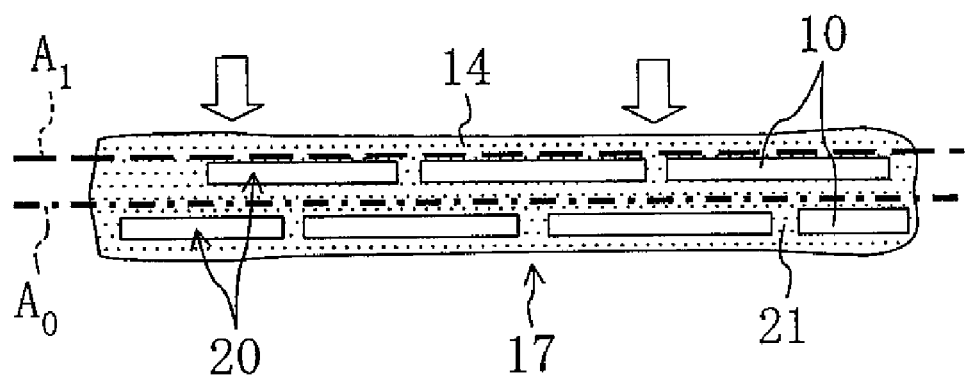
FIG. 7 is an enlarged plan view of spacers of the first preferred embodiment of the present invention.

On the other hand, in this preferred embodiment, as shown in FIG. 7, two spacer rows 20 are formed in the seal region 17 and each spacer row 20 is formed by arranging a plurality of spacers 10 having a rectangular shape when viewed two-dimensionally with a slit portion 21 interposed therebetween. Accordingly, when a flowable seal member 14 is applied to the seal region 17 by a dispenser or the like, an applied position $A_1$ of the seal member 14 may be located slightly away from a central position $A_0$ of the seal region 31. However, since the seal region 17 has a larger surface area due to the two spacer rows 20, the seal member 14 is attracted toward the central position $A_0$ of the seal region 17 by a surface tension.

In other words, even if the seal member 14 is applied to a position slightly away from the central position $A_0$ of the seal region 17 where the seal member 14 is supposed to be applied, the seal member 14 can be supplied to the central position $A_0$ of the seal region 17 by the spacer rows 20.

Next, in the bonding step, as shown in FIG. 5, the second substrate 12 is bonded to the first substrate 11 through the seal member 14. The seal member 14 is pressed between the first substrate 11 and the second substrate 12, and thus spread to the display region 15 side and the opposite side to the display region 15 of the spacer rows 20. As a result, the two spacer rows 20 are entirely covered by the seal member 14. The liquid crystal display device 1 is thus manufactured.

Effects of the First Preferred Embodiment

According to the first preferred embodiment, two spacer rows 20 are provided in the seal region 17, and each spacer row 20 is defined by a plurality of spacers 10 preferably having a rectangular or substantially rectangular shape when viewed from above and arranged with a slit portion 21 interposed therebetween. The seal member 14 can therefore be easily and accurately provided in the seal region 17.

In other words, by providing two spacer rows 20, the surface area of the seal region 17 is increased, whereby the flowable seal member 14 can be more easily attracted toward the seal region 17 by a surface tension. Accordingly, even if the seal member 14 is applied by a dispenser or the like to a position slightly away from the seal region 17 of the first substrate 11 where the seal member 14 is supposed to be provided, the seal member 14 can be attracted to the seal region 17 by the two spacer rows 20. As a result, the seal member 14 can be easily and accurately positioned in a desired seal region 17 where the two spacer rows 20 are provided.

Moreover, a plurality of slit portions 21 are provided in each spacer row 20. Accordingly, even if a pressure is applied to the seal member 14, the pressure can be dispersed through the slit portions 21, and a concentration of pressure on a predetermined region of the seal member 14 can be prevented.

Moreover, because the spacers 10 are made of a material having relatively low moisture permeability, a thermoplastic resin having relatively high moisture permeability and relatively high elastic force can preferably be used as a seal member. In other words, moisture permeability in the seal region 17 can be reduced while maintaining the overall flexibility of the liquid crystal display device 1 also in the seal region 17.

Moreover, the slit portions 21 in each spacer row 20 are arranged so as not to overlap the slip portions 21 in an adjacent spacer row 20 in a direction substantially perpendicular to the arranging direction of the spacer row 20. Since the slit portions 21 in each spacer row 20 do not face the slit portions 21 in an adjacent spacer row 20, outside moisture is less likely to continuously flow through the slit portions 21 of adjacent spacer rows 20. Accordingly, entry of outside moisture to the liquid crystal layer 13 side (the display region 15 side) can be more suppressed.

Second Preferred Embodiment

Figure 10:
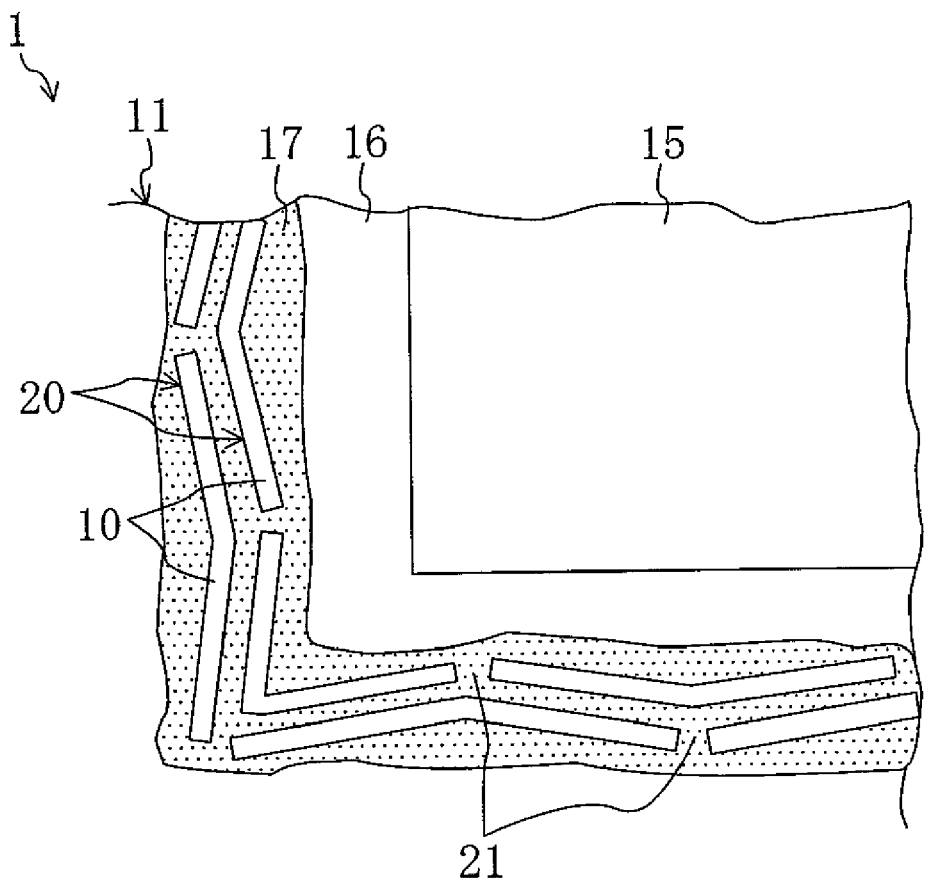
FIG. 10 is a partial enlarged plan view of a liquid crystal display device according to a second preferred embodiment of the present invention.
Figure 11:
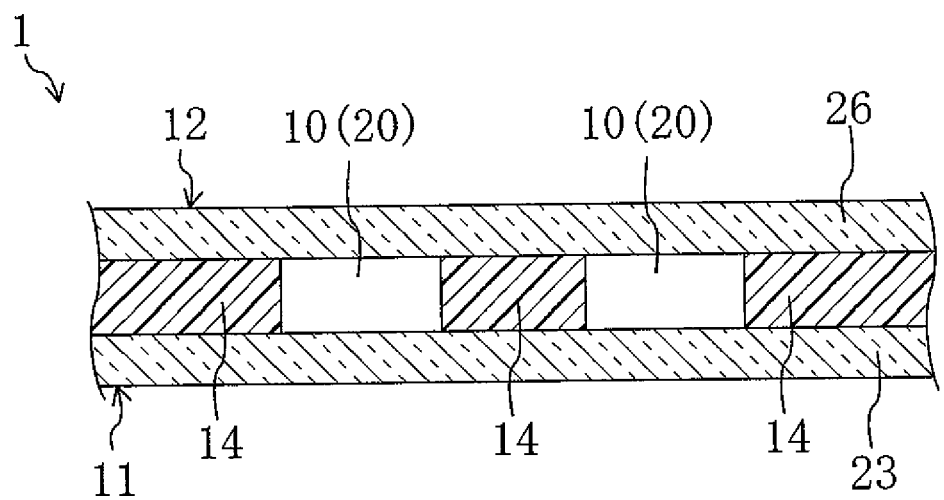
FIG. 11 is a cutaway section showing a seal potion of the liquid crystal display device according to a preferred embodiment of the present invention.

FIGS. 10 and 11 show a second preferred embodiment of the invention. Note that in each preferred embodiment described below, the same portions as those of FIGS. 1 through 9 are denoted by the same reference numerals and detailed description thereof will be omitted.

The second preferred embodiment is different from the first preferred embodiment in that the shape of the spacer rows 20 is different. More specifically, in the first preferred embodiment, the spacers 10 of the spacer rows 20 preferably have an elongated shape so as to extend approximately in parallel with the four sides of a rectangle along the outer edge of the display region 15 (as shown in FIG. 1). Spacers 10 of this preferred embodiment, on the other hand, are slightly tilted with respect to the four sides along the outer edge of the display region 15.

As shown in a plan view of FIG. 10, each spacer 10 has a wide open approximately V-shaped form. At the corners of the spacer rows 20, the spacer 10 may either have an approximately L-shape or a slit portion 21 provided as a gap between the spacers 10.

As described above, the spacer rows 20 do not have to extend in parallel with the outer edge of the display region 15 and can be arranged along the outer edge of the display region 15. Moreover, in adjacent spacer rows 20, the opposing portions of the spacers 20 extend substantially in parallel with each other. As shown in a cross-sectional view of FIG. 11, the spacers 10 preferably have a height of about 5 μm and a width of about 10 μm. The gap between the spacer rows 20 is defined to be about 10 μm, for example.

The same effects as those of the first preferred embodiment can be obtained even when the spacers 10 are provided as described above.

Third Preferred Embodiment

Figure 12:
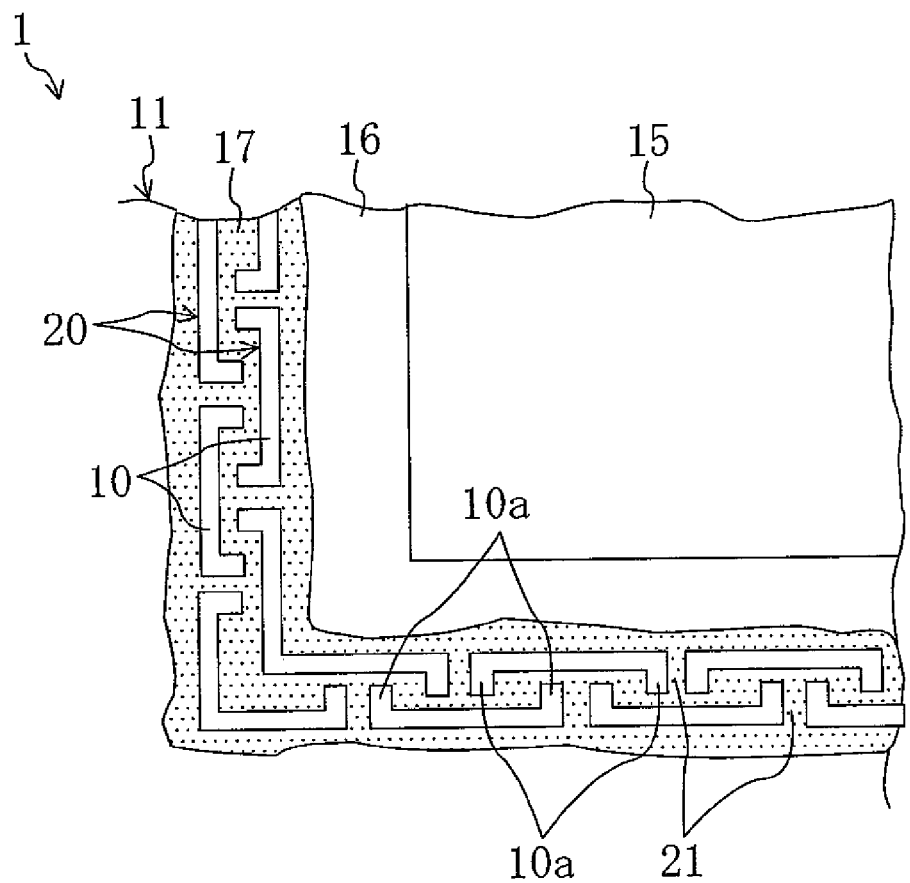
FIG. 12 is a partial enlarged plan view of a liquid crystal display device according to a third preferred embodiment of the present invention.
Figure 13:
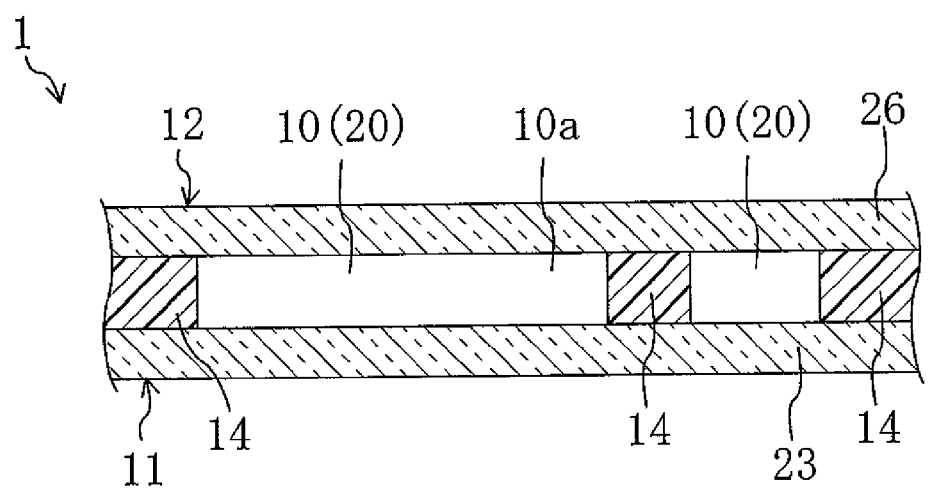
FIG. 13 is a cutaway section showing a seal potion of the liquid crystal display device according to a preferred embodiment of the present invention.

FIGS. 12 and 13 show a third preferred embodiment of the present invention.

Spacers 10 of the third preferred embodiment are patterned to have a hook shape extending along the outer edge of the display region 15. More specifically, as shown in a plan view of FIG. 12, a protruding portion 10a protruding toward the display region 15 side or toward the opposite side to the display region 15 is provided at both ends of each spacer 10. For example, in one of the two spacer rows 20 that are located on the display region 15 side, a protruding portion 10a protruding toward the opposite side to the display region 15 is provided at both ends of the spacer 10 having an elongated shape. In the other spacer row 20 located on the opposite side to the display region 15, on the other hand, a protruding portion 10a protruding toward the display region 15 is provided at both ends of the spacer 10.

The same effects as those of the first preferred embodiment can be obtained even when the spacers 10 are patterned as described above. Moreover, this structure increases a passage of moisture that tries to pass through the seal member 14, whereby moisture permeation can be more effectively suppressed.

Fourth Preferred Embodiment

Figure 14:
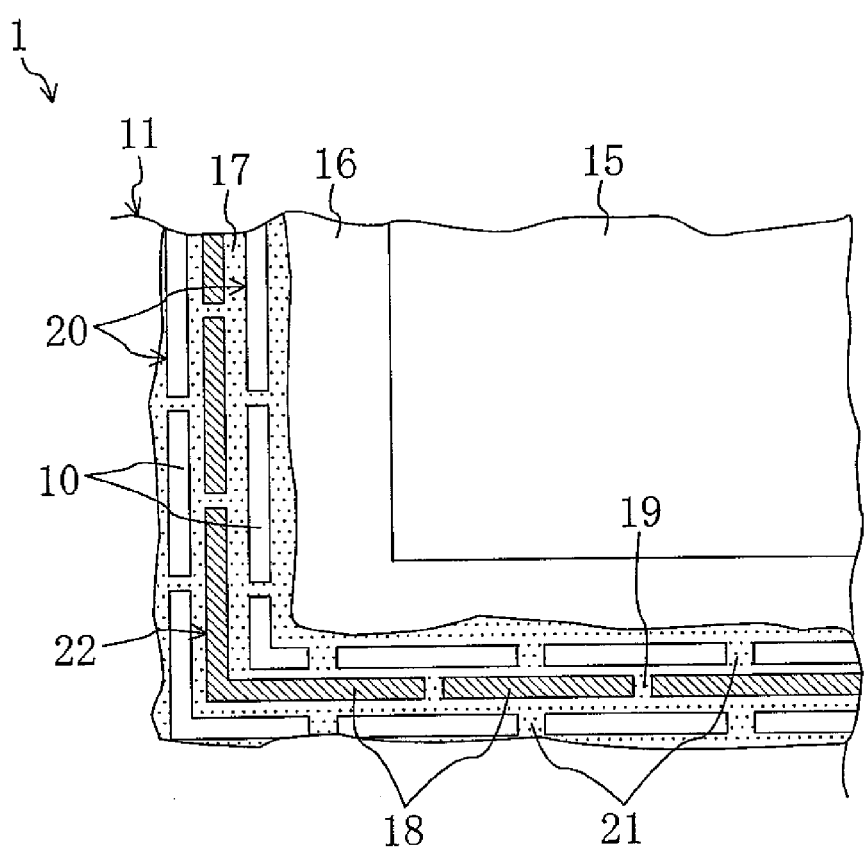
FIG. 14 is a partial enlarged plan view of a liquid crystal display device according to a fourth preferred embodiment of the present invention.
Figure 15:
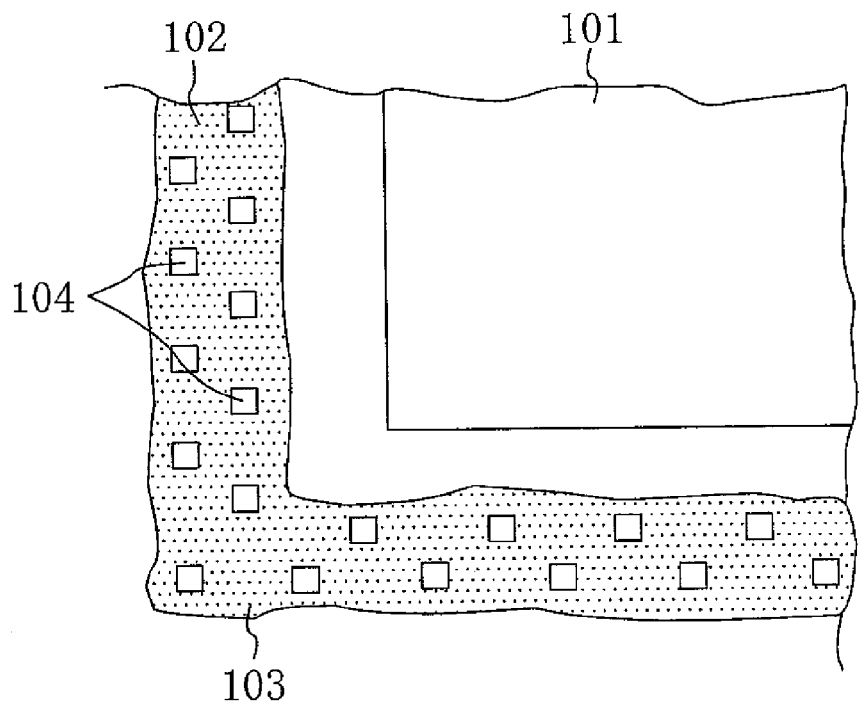
FIG. 15 is a partial enlarged plan view of a conventional liquid crystal display device.

FIG. 14 is a partial enlarged plan view of a liquid crystal display device 1 and shows a fourth preferred embodiment of the present invention.

The liquid crystal display device 1 of the fourth preferred embodiment preferably has three spacer rows 20 and 22, for example. Two spacer rows 20 having a double rectangular frame shape are provided on the second substrate 12, while a spacer row 22 is provided on the first substrate 11 so as to be disposed between the two spacer rows 20. Like the spacer rows 20, the spacer row 22 is also provided by a plurality of spacers 18 arranged in line at predetermined intervals. In other words, a slit portion 19 is provided between the spacers 18 of the spacer row 22. Moreover, the slit portions 19 and 21 are arranged so as not to overlap each other in a direction perpendicular to the arranging direction of the spacer row 20, 22 (in other words, the extending direction of the spacers 20 and 22).

According to the fourth preferred embodiment, triple spacer rows 20 and 22 are preferably provided in the seal region 17 on different substrates (that is, the first substrate 11 or the second substrate 12). Since the alternately arranged spacer rows 20 and 22 are provided on different substrates, moisture that tries to pass through the seal region 17 can be more effectively blocked. Moreover, since adjacent spacer rows 20 and 22 are provided on different substrates (that is, on the first substrate 11 or the second substrate 12), the gap between the spacers 20 and 22 can be reduced. As a result, more spacer rows 20 and 22 can be easily provided in many overlapping regions in the seal region 17 of a predetermined width. Accordingly, the moisture blocking effect can further be improved while reducing the area of the frame region.

Note that the total number of spacer rows 20 and 22 is not limited to three. One or more spacer rows may be provided on each of the first substrate 11 and the second substrate 12. In other words, a total of two or more spacer rows may be provided on the first substrate 11 and the second substrate 12. The one or more spacer rows provided on the first substrate 11 and the one or more spacer rows provided on the second substrate 12 may be alternately arranged when the first substrate 11 and the second substrate 12 are bonded to each other. The spacers 10, 18 may be shaped as described in the second or third preferred embodiment.

Other Preferred Embodiments

In the above preferred embodiments, a liquid crystal display device is described as an example. However, the present invention is not limited to this, and the present invention is similarly applicable to other display devices such as an organic EL display device having a light-emitting layer as a display medium layer.

As has been described above, the present invention is useful for a display device having a display region surrounded by a seal member, and a manufacturing method thereof. The present invention is suitable especially to easily and accurately form a seal member in a predetermined region.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:
1. A display device, comprising:
a pair of substrates connected to each other;
a display medium layer provided between the pair of substrates;
an approximately frame-shaped seal member arranged to seal the display medium layer between the pair of substrates; and
a display region arranged to be surrounded by the seal member; wherein in the display region on one of the pair of substrates, spacers having a dot pattern are dispersedly arranged at predetermined intervals;
a plurality of spacer rows are located outside of the display region on one of the pair of substrates, and each spacer row includes a plurality of spacers arranged in line at predetermined intervals along an outer edge of the display region;
each spacer in each spacer row is made of the same material as that of the spacers in the display region, is made of a material having a lower moisture permeability than a moisture permeability of the seal member which is cured, and has a substantially elongated shape extending along the outer edge of the display region;
a gap between adjacent spacers in each spacer row is defined by a slit portion having a shorter length than a longitudinal length of the spacer;
the slit portion is filled with the seal member;

the plurality of spacer rows are entirely circumferentially covered by the seal member between the pair of substrates;

wherein the slit portion in one of the plurality of spacer rows is arranged so as to not overlap with the slit portion in an adjacent spacer row in a direction substantially perpendicular to an arranging direction of the spacer row;

wherein two of the spacer rows are located outside the display region; and in one of the two of the spacer rows which is located on a display region side, first protruding portions protruding toward an opposite side to the display region are located at both ends of the spacer, and in the other of the two of the spacer rows which is located on the opposite side to the display region, second protruding portions protruding toward the display region side are located at both ends of the spacer.

2. The display device according to claim 1, wherein the seal member is made of a thermoplastic resin.

3. A method for manufacturing a display device in which a display medium layer is sealed by an approximately frame-shaped seal member between a first substrate and a second substrate, and a display region contributing to display is arranged to be surrounded by the seal member, the method comprising:

a spacer row formation step of forming spacers having a dot pattern to be dispersedly arranged at predetermined intervals in the display region on the first substrate, and forming a plurality of spacer rows outside the display region on the first substrate with each spacer row being formed by a plurality of spacers arranged in line at predetermined intervals along an outer edge of the display region;

a seal member supply step of supplying a flowable seal member to a region where the spacer rows are formed on the first substrate; and a bonding step of bonding the second substrate to the first substrate with the seal member interposed therebetween; wherein in the spacer row formation step, each spacer in each spacer row is made of the same material as that of the spacers in the display region, is made of a material having a lower moisture permeability than a moisture permeability of the seal member which is cured, and has a substantially elongated shape extending along the outer edge of the display region, and a gap between adjacent spacers in each spacer row is formed as a slit portion having a shorter length than a longitudinal length of the spacer;

in the bonding step, the slit portion is filled with the seal member, the plurality of spacer rows are entirely circumferentially covered by the seal member between the first substrate and the second substrate bonded to each other;

wherein in the spacer row formation step, the slit portion in one of the plurality of spacer rows is formed so as to not overlap with the slit portion in an adjacent spacer row in a direction substantially perpendicular to an arranging direction of the spacer row; and wherein in the spacer row formation step, two of the spacer rows are located outside the display region, and in one of the two of the spacer rows which is located on a display region side, first protruding portions protruding toward an opposite side to the display region are located at both ends of the spacer, and in the other of the two of the spacer rows which is located on the opposite side to the display region, second protruding portions protruding toward the display region side are located at both ends of the spacer.

4. The method for manufacturing a display device according to claim 3, wherein the seal member is made of a thermoplastic resin.

* * * * *